Patented May 8, 1945

2,375,638

UNITED STATES PATENT OFFICE 2,375,638

BORO-PHOSPHORIC ACID AND METHOD OF PREPARING THE SAME

Leonard H. Englund, Winona, Minn.

No Drawing. Application May 17, 1941,
Serial No. 393,936

6 Claims. (Cl. 23—106)

This invention relates to the provision and production of phosphorus pentoxide derivatives and has as a general object the provision and preparation of a novel boro-phosphoric acid and a method of preparing various salts thereof.

A more specific object of the invention is the provision of a novel powdery non-hygroscopic acid comprising acid oxide groups of boron and phosphorus together with certain molecular proportions of water.

Another object of the invention is the provision of a novel boro-phosphoric acid which has a relatively great capacity for neutralizing bases and which can be readily stored and handled as other non-corrosive powders without requiring expensive rubber-coated or rubber-lined equipment and containers.

A further object of the invention is to provide such an acid as a source of certain useful derivatives including boron phosphate, ammonium salts of the acid, and sodium salts thereof as well as the salts of other alkaline earth metals.

The invention has as another object the provision of a novel and improved method of preparing the novel acid and its salts and other derivatives involving a reaction between phosphorus pentoxide and boric acid.

Other objects of the invention will become apparent from the following description of a preferred embodiment of the invention.

It is generally believed that dry powdered boric acid does not react with dry powdered phosphorus pentoxide, and further that if water be added to the mixture of such powders, one of the following results will be obtained:

(a) The formation of a proportional amount of meta-phosphoric acid, $HPO_3$, with boric acid, $B(OH)_3$ according to the equation:

$$P_2O_5 + 2B(OH)_3 + H_2O \rightarrow 2HPO_3 + 2B(OH)_3; \text{ or}$$

(b) If more water be added, the formation of a larger proportion of either or both of the phosphoric acids, meta-, $HPO_3$, and ortho-, $H_3PO_4$ with boric acid or with boric oxide, $B_2O_3$; according to the following respective equations:

$$P_2O_5 + 2B(OH)_3 + 3H_2O \rightarrow 2H_3PO_4 + 2B(OH)_3$$

$$P_2O_5 + B(OH)_3 + 2H_2O \rightarrow HPO_3 + H_3PO_4 + B(OH)_3$$

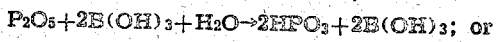

Notwithstanding that general belief, I have discovered a powdery non-hygroscopic acid comprising poly-acid oxide groups of boron and phosphorus together with certain molecular proportions of water, and how to make such an acid and derivatives thereof by reacting commercial dry powdered boric acid with commercial dry powdered phosphorus pentoxide. The novel acid has the formula $B_4O_7(H_3P_2O_6)_2$ and therefore has been termed tetraborohypophosphoric acid. Approximately two molecular equivalents of the phosphorus pentoxide $P_2O_5$, to about four molecular equivalents of the boric acid $B(OH)_3$ are employed in the reaction which is represented by the following equation:

$$2P_2O_5 + 4B(OH)_3 \rightarrow B_4O_7(H_3P_2O_6)_2 + 3H_2O$$

While I do not wish the invention limited to any theory of the reactions which may be involved, in view of the general belief stated above, it might be well to point out by way of possible explanation that I believe the two molecular equivalents of the phosphorus pentoxide, $2P_2O_5$, abstract from the four molecular equivalents of the boric acid, $4B(OH)_3$, three molecular equivalents of water. Thus the boron oxide groups may be converted into one molecular equivalent of pyro-boric acid, $H_4B_2O_5$, and one molecular equivalent of meta-boric acid, $H_2B_2O_4$ according to the following equation:

(1)   $4B(OH)_3 \rightarrow H_4B_2O_5 + H_2B_2O_4 + 3H_2O$

Under the conditions of the reactions to be more fully described presently, the pyro- and meta-boric acids probably combine to form one molecular equivalent of tetra-boric acid, $H_2B_4O_7$, with the liberation of two molecular equivalents of water which are free to evaporate. This reaction may be represented by the following equation:

(2)   $H_4B_2O_5 + H_2B_2O_4 \rightarrow H_2B_4O_7 + 2H_2O$

The two molecular equivalents of the phosphorus pentoxide, $2P_2O_5$, with the three molecular equivalents of water (see Equation 1 above) abstracted from the four molecular equivalents of the boric acid, $4B(OH)_3$, I believe, form one molecular equivalent of tetra-phosphoric acid, $H_6P_4O_{13}$, according to the equation:

(3)   $2P_2O_5 + 3H_2O \rightarrow H_6P_4O_{13}$

That tetra-phosphoric acid, $H_6P_4O_{13}$, probably combines with the tetra-boric acid, $H_2B_4O_7$ to form one molecular equivalent of the novel acid herein called tetraborohypophosphoric acid, $B_4O_7(H_3P_2O_6)_2$, liberating one molecular equivalent of water which is free to evaporate and which is probably formed by the separating off of two hydrogen atoms from the tetra-boric acid and one oxygen atom from the tetra-phosphoric acid reducing the latter to the hypo-phosphoric acid, $H_3PO_3$. Such reaction is represented by the following equation:

(4)   $H_2B_4O_7 + H_6P_4O_{13} \rightarrow B_4O_7(H_3P_2O_6)_2 + H_2O$

Regardless of the correct explanation, when in accordance with my invention the commercial dry powders of phosphorus pentoxide and boric acid are intimately mixed in the proportions hereinabove described and to that mixture is added a small quantity of water, a reaction is almost immediately initiated and proceeds throughout the entire mixture with a hissing noise and the evolution of fumes and results in a generous yield of the novel boro-phosphoric acid.

For example, 56 grams of commercial powdered phosphorus pentoxide are intimately mixed with 50 grams of commercial powdered boric acid. After so mixing, one or two drops of water are added to the mixed powders whereupon the vigorous progressive reaction occurs as just described. The resulting mass is slightly moist and weighs a little less than the total weight of the components. After drying in a hot air oven, at a temperature less than 100 degrees C., the yield is 95 grams of the tetraborohypophosphoric acid.

The novel acid so made is a dry non-hygroscopic powder and hence can be handled and stored as any non-corrosive powder without employing expensive rubber-lined equipment and containers. In general it has the properties of ortho-phosphoric acid and in addition it has other properties not possessed by ortho-phosphoric acid. It has a relatively great capacity to neutralize bases. For example, 17½ grams of sodium carbonate was required to be added to 10 grams of the novel acid to develop an alkaline reaction with phenolphthalein.

The novel acid has many desirable derivatives. One such derivative is boron phosphate $BPO_4$. Boron phosphate has valuable applications as a catalyst in organic reactions and especially in thermal treatments of petroleum derivatives and as a double acid oxide component of vitreous enamels and ceramic products. It is made according to the invention by heating, for example, 10 grams of the novel acid for one-half hour at red heat with a yield of 8.9 grams of boron phosphate. The reaction is

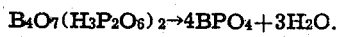

$$B_4O_7(H_3P_2O_6)_2 \rightarrow 4BPO_4 + 3H_2O.$$

The water soluble form of boron phosphate is made when the temperature employed in the reaction just described is less than 400 degrees C. but not less than about 200 degrees C. So made, the resulting boron phosphate slowly hydrolyzes and dissolves in water. The water and acid insoluble form of boron phosphate is made by employing in the above mentioned reaction a temperature above 400 degrees C. The resulting boron phosphate is not only water insoluble but is also infusible at white heat.

The ammonium, sodium, and other alkaline-base salts of the novel acid are made in general by:

(a) Neutralizing or combining such bases with the novel acid in aqueous solution; or (b) Combining the alkaline-base with boric acid and, with the borate thus obtained, reacting phosphorus pentoxide in the manner described hereinabove for the preparation of the borophosphoric acid; or (c) In some cases mixing and heating the alkaline base, boric acid, and phosphorus pentoxide without first making the borate.

For example, crystalline disodium phosphate is heated until it melts or dissolves in its water of crystallization. Boric acid is then dissolved therein. The solution so prepared does not recrystallize upon cooling but remains as a syrupy liquid. If that solution be heated to a temperature below the ebullition point, a different salt is obtained from that obtained where the temperature is kept at the ebullition point. The product made by heating below the ebullition point differs from the other in that it is very slowly soluble, even in hot water, whereas when prepared by heating at the ebullition point, the resulting salt is so instantly soluble in water that the escape of occluded air is audible when a lump of it is dropped into water.

Sodium salts of the novel acid have thus been prepared ranging from those having a sharp acid reaction to those which are alkaline in solution. Such salts which are alkaline have valuable detergent, emulsification, and water conditioning properties and may be incorporated in water soluble soaps. Those which are acid exhibit a degree of tackiness or adhesiveness that is truly remarkable. In addition the sodium salts are useful in coating filters used in air conditioning apparatus by immersing the filters in water solutions of the salts and thereafter evaporating the excess water.

Similarly, the products of this reaction between boric acid and mono-ammonium phosphate, di-ammonium phosphate, or mixtures of sodium and ammonium phosphates are made and the resulting salts exhibit either an acid or alkaline reaction in accordance with the ratio of the bases and acid oxide groups which may be present. Such salts have a syrupy consistency which persists even after baking at high temperatures. The resistance to crystallization under such conditions makes these salts useful as the dispersion agent in fire-proofing or fire-resisting compounds.

While a specific embodiment of the invention has been described, it will be understood that the invention is not limited to the precise details hereinabove set forth by way of illustration, but instead what is claimed and desired to be secured by United States Letters Patent is:

1. The method of producing a water soluble phosphorus-boron containing composition which comprises reacting boric acid with phosphorus pentoxide at a temperature below 400° C. in the presence of a reaction product of water and phosphorus-pentoxide.

2. The method of producing a water soluble phosphorus-boron containing composition which comprises reacting boric acid with phosphorus pentoxide at a temperature below 200° C. in the presence of a reaction product of water and phosphorus pentoxide.

3. The method of producing a water soluble acid anhydride having the empirical formula $BPO_4$ which comprises heating at a temperature of between 200° C. and 400° C., a compound obtained by reacting boric acid with phosphorus pentoxide at a temperature below 200° C.

4. A compound selected from the group consisting of a water soluble compound obtained by reacting boric acid with phosphorus pentoxide at a temperature below 200° C., and salts thereof.

5. A water soluble composition having the empirical formula $H_6P_4B_4O_{19}$ obtained by reacting boric acid with phosphorus pentoxide at a temperature below 200° C.

6. A water soluble acid anhydride having the empirical formula $BPO_4$ obtained by heating at a temperature between 200° C. and 400° C., a water soluble compound obtained by reacting boric acid with phosphorus pentoxide at a temperature below 200° C.

LEONARD H. ENGLUND.